Aug. 5, 1947.  C. G. VOKES  2,425,139
FILTER
Filed Dec. 21, 1943   2 Sheets-Sheet 1
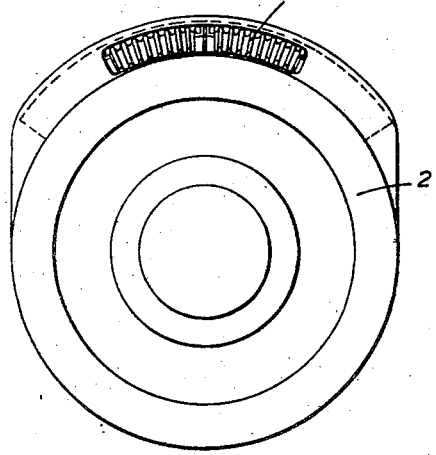
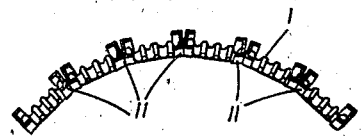
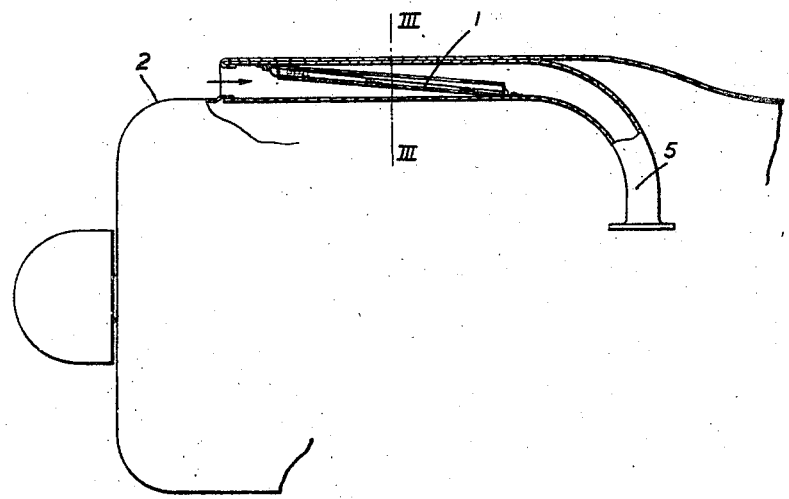
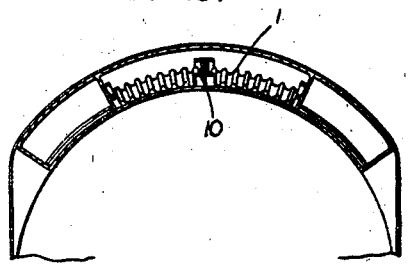
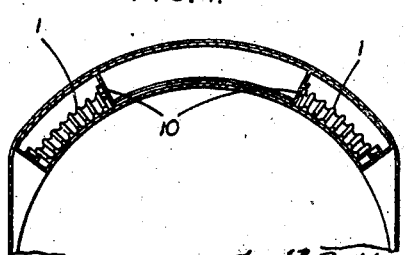
Inventor
Cecil G. Vokes
By
Attorney Inventor
Cecil G. Vokes
By
Attorney Patented Aug. 5, 1947

2,425,139

UNITED STATES PATENT OFFICE 2,425,139

FILTER

Cecil Gordon Vokes, London, England, assignor to Vokes Limited, Guilford, Surrey, England Application December 21, 1943, Serial No. 515,171
In Great Britain November 19, 1942

3 Claims. (Cl. 183—71)

A panel type of filter with a deeply pocketed or pleated element has been used extensively for filtering the intake air of internal combustion engines upon aircraft. Such a filter is usually fitted at a considerable incline within or behind an intake duct or scoop and with the folds running longitudinally. The practice has been to enclose a pleated element in a suitable frame to form a panel unit, but unless the panel can lie partly inside the normal skin of the aircraft, this involves accommodating nearly the whole or a considerable part of the thickness of the unit at each end of the unit at the expense of the area available for air for any given projection of a scoop or available width (or height) of duct. As deep pleats (used to include any appropriate form of pocket, corrugation or the like) are desirable to give a sufficient filtering area relatively to the panel area, the thickness may be considerable. In particular, where a bulge is used on top of a cowling for a down draught intake, the filter panel commonly slopes downward and backward in the bulge and nearly its full thickness has normally to be allowed for both at its front and at its back end. In other words the frame of the panel unit covers the ends of the pleats and, owing to its inclination, obstructs a considerable area.

In arrangements according to the present invention, the area of the pleats of an inclined panel thus normally obstructed is largely utilised for air flow. This may be done by closing the front ends of the folds which are open to the rear ("clean") part of the duct and leaving clear on the "dirty" side the front ends of the folds open to the air to be cleaned and vice versa as regards the rear ends. A metal fitting formed with projections preferably of tapered or stream lined form can be used to cover the ends of the folds. Alternatively the folds may taper off so that the screen becomes flat at the end. The form of filter unit or element giving freedom of longitudinal entry to and exit from the folds is in itself an important part of the invention.

Other parts of the invention are embodied in typical preferred forms which will now be described by way of example as fitted to an aircraft, and illustrated by the accompanying drawings. The parts of the invention for which a monopoly is desired are those delimited by the claims.

Referring to the drawings:

Fig. 1 is a part elevation of the cowling of a radial engine.

Fig. 2 is a partial side elevation, partly in section, of the same,

Fig. 3 shows a section on line III—III of Fig. 2,

Fig. 4 shows the same with the filter units displaced to give an open intake,

Fig. 5 shows elements hinged together to make the curved units of the preceding figures.

Figure 6:
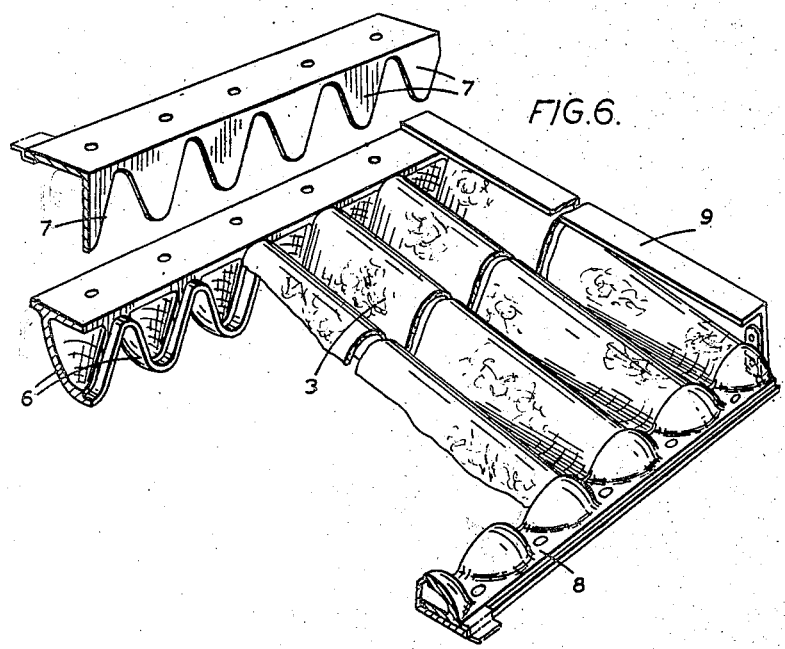
Fig. 6 is a fragmentary perspective view of an element to a larger scale.
Figure 7:
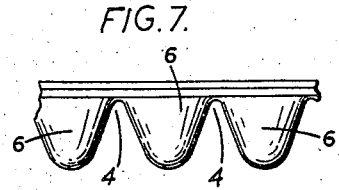
Figs. 7 and 8 are fragmentary views respectively in front elevation and in section from the rear to the scale of Fig. 6.
Figure 8:
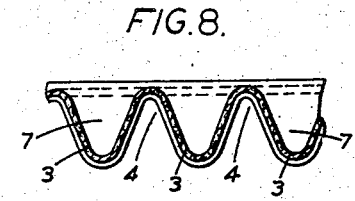

As illustrated in Figs. 1 to 5 a filter element 1 is fitted with its front end at the top and near the entry of the intake at the top of an engine cowling 2. The element has folds 3 which project downwardly (see Figs. 6 to 8) to produce a zig-zag or saw-tooth formation when viewed from in front and which are deeper at the front than at the rear of the element. The front ends of the downwardly projecting folds or V's are suitably closed, leaving open-ended inverted V's or channels 4 exposed to the incoming air. As the unit runs back and towards the bottom of the duct these channels can become narrower and shallower until closed and the unit sealed against the bottom of the duct. In effect, there are thus open-ended channels or pockets of filtering material exposed to the incoming air and of reduced area as they run rearwardly until finally sealed off. As indicated by arrows in Fig. 2, the air enters at the opening in front of the cowling and is conducted to the engine intake by the duct 5 at the back. A typical construction will be understood from Figs. 6 to 8 in which the sealing member at the front includes suitably rounded channelled noses 6 giving a more or less stream-lined entry and conforming to the folds of the element which can be secured by a locking bar with fingers 7 corresponding to the channels. A similar, but inverted, construction indicated at 8 seals off the back. The framing can be completed by side members 9, either parallel-sided as shown or tapered (as requires no illustration) to confrom to the taper of the folds. It will be noted that the taper and spacing of the folds can be made to conform to a great variety of different widths or curvatures or both at the front and back respectively of the filter.

In case the filter is to remain permanently in position it can, of course, occupy the whole spare made available for fitting it, but it is often desirable to provide for an alternative open intake.

Figs. 3 and 4 are fragmentary sectional views showing a convenient method by which the filter unit is made in two halves (carrying packing at 10), so that they can be readily slid by normal control means from the operative position of Fig. 3 to the open intake position of Fig. 4. It may be convenient to vary the curvature slightly in this movement, or it may be easier to manufacture the filter frames in smaller units. In either case the units can be built up of several elements hinged together by hinging and sealing material at 11, as indicated in Fig. 5.

Although certain specific embodiments of the present invention have been shown and described herein, it is obvious that many modifications thereof are possible. The invention, therefore, is not to be restricted except insofar as is necessitated by the prior art and by the scope of the appended claims.

I claim:

1. A filter panel comprising a pleated filter element having a series of pleats with spaces between the folds thereof, sealing means at one end of said element and closing the spaces between the folds of the pleats on one side of the series of pleats but leaving open the spaces between the folds of the pleats on the opposite side of said series of pleats, and sealing means at the other end of the element and closing the spaces between the folds of the pleats that are open at the first mentioned end.

2. In combination, a duct defining an air passageway and having a recess defining a receiving space on each side thereof, and a filter panel section mounted in each recess for movement toward each other into edge contact and across the air passageway and for movement away from each other and into the receiving space of their respective recess to open said passageway to unfiltered air.

3. An aircraft having a curved air intake duct of cross section conforming to the curve of a curved portion of the aircraft, a filter panel made up of two complete sections of conforming curvature and in side by side contact, said panel sections being inclined lengthwise between the top and bottom of the duct and spanning the air passageway when in operative position and movable in opposite directions and relative to each other to define an intake open to the passage of unfiltered air, and means defining receiving spaces into which the filter sections may be moved to provide such open space.

CECIL GORDON VOKES.

REFERENCES CITED

The following references are of record in the file of this patent:

UNITED STATES PATENTS

| Number | Name | Date |
| --- | --- | --- |
| 549,390 | Patterson et al. | Nov. 5, 1895 |
| 1,120,130 | Casella | Dec. 8, 1914 |
| 2,210,397 | Dreiss | Aug. 6, 1940 |
| 2,230,765 | Shimer | Feb. 4, 1941 |
| 705,944 | Mitchell | July 29, 1902 |
| 2,058,669 | Dollinger | Oct. 27, 1936 |
| 2,201,628 | McCormick et al. | May 21, 1940 |
| 1,813,584 | Sanders | July 7, 1931 |
| 1,669,461 | Gamble | May 5, 1928 |

FOREIGN PATENTS

| Number | Country | Date |
| --- | --- | --- |
| 495,369 | Great Britain | Nov. 7, 1938 |